United States Patent
Haymart et al.

(10) Patent No.: US 8,731,748 B2
(45) Date of Patent: May 20, 2014

(54) PREDICTIVE MAPPING SYSTEM FOR ANGLERS

(75) Inventors: Keely Brian Haymart, Ann Arbor, MI (US); Daniel Kevin Reed, Madison, WI (US); Ryan Richard Rist, Madison, WI (US)

(73) Assignee: Strategic Fishing Systems, LLC, Madison, WI (US)

( * ) Notice: Subject to any disclaimer, the term of this patent is extended or adjusted under 35 U.S.C. 154(b) by 74 days.

(21) Appl. No.: 13/035,377

(22) Filed: Feb. 25, 2011

(65) Prior Publication Data

US 2011/0213515 A1 Sep. 1, 2011

Related U.S. Application Data

(60) Provisional application No. 61/308,299, filed on Feb. 26, 2010.

(51) Int. Cl.
*G06F 17/30* (2006.01)
*B63B 49/00* (2006.01)

(52) U.S. Cl.
CPC ........... *G06F 17/30241* (2013.01); *B63B 49/00* (2013.01)
USPC ...................... 701/21; 701/540; 702/2; 702/5

(58) Field of Classification Search
USPC ......... 701/400, 408, 426, 430, 461, 468, 516, 701/517, 521, 21, 540; 702/2, 150, 5; 340/539.1, 539.11
See application file for complete search history.

(56) References Cited

U.S. PATENT DOCUMENTS

| | | | | |
|---|---|---|---|---|
| 5,491,636 | A | * | 2/1996 | Robertson et al. ............ 701/468 |
| 6,222,449 | B1 | * | 4/2001 | Twining ................... 340/539.11 |
| 6,459,372 | B1 | * | 10/2002 | Branham et al. ........... 340/539.1 |
| 7,200,488 | B2 | * | 4/2007 | Taboada ........................ 701/461 |
| 7,254,483 | B2 | * | 8/2007 | Squires et al. .................... 702/2 |
| 7,457,720 | B2 | * | 11/2008 | Ebert ............................ 702/150 |
| 7,466,628 | B2 | * | 12/2008 | Hansen ............................ 367/88 |

* cited by examiner

*Primary Examiner* — Helal A Algahaim
*Assistant Examiner* — Dale W Hilgendorf
(74) *Attorney, Agent, or Firm* — Foley & Lardner LLP

(57) ABSTRACT

A method includes receiving, at a computing device, a search request that includes one or more search criteria for a body of water. The one or more search criteria include an identification of a fish species. One or more locations on the body of water that satisfy the one or more search criteria are identified. The one or more locations include at least one predicted location of the fish species within the body of water. The one or more locations are highlighted on a map of the body of water.

20 Claims, 5 Drawing Sheets

PREDICTIVE MAPPING SYSTEM FOR ANGLERS

CROSS-REFERENCE TO RELATED APPLICATIONS

The present application claims priority to U.S. Provisional Patent Application No. 61/308,299 filed on Feb. 26, 2010, the entire disclosure of which is hereby incorporated by reference.

BACKGROUND

The following description is provided to assist the understanding of the reader. None of the information provided or references cited is admitted to be prior art.

Fish are generally not scattered evenly throughout a body of water. Fish densities tend to be higher in areas that offer protection or cover from predators and sun light, easy access to food, and some element of diversity in bottom topography. Such bottom topography diversity is often referred to as structure, and includes drop-offs, underwater humps, underwater points, rock piles, underwater logs/trees, etc. A fish's location within these areas is also influenced by season, time of day, and weather conditions which affect water temperature, oxygen levels, and ultraviolet light levels. Different species of fish react to the above factors differently and have unique habitat preferences. Thus, at any given time, different species of fish can be located in different areas of the lake, at different depths, and at different proximities to certain types of structure. Given the number of variables that may influence fish location, finding fish within a body of water can be a difficult task and is one reason that fishing is a very challenging activity.

SUMMARY

An illustrative method includes receiving, at a computing device, a search request that includes one or more search criteria for a body of water. The one or more search criteria include an identification of a fish species. One or more locations on the body of water that satisfy the one or more search criteria are identified. The one or more locations include at least one predicted location of the fish species within the body of water. The one or more locations are highlighted on a map of the body of water.

An illustrative system includes a memory configured to store information regarding a body of water. The system also includes a processor operatively coupled to the memory. The processor is configured to receive a search request that includes one or more search criteria for the body of water, where the one or more search criteria include an identification of a fish species. The processor is also configured to identify one or more locations on the body of water that satisfy the one or more search criteria, where the one or more locations comprise at least one predicted location of the fish species within the body of water. The processor is further configured to highlight the one or more locations on a map of the body of water.

An illustrative non-transitory computer-readable medium has instructions stored thereon. The instructions include instructions to receive a search request that includes one or more search criteria for a body of water, where the one or more search criteria include an identification of a fish species. The instructions also include instructions to identify one or more locations on the body of water that satisfy the one or more search criteria, where the one or more locations comprise at least one predicted location of the fish species within the body of water. The instructions further include instructions to highlight the one or more locations on a map of the body of water.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
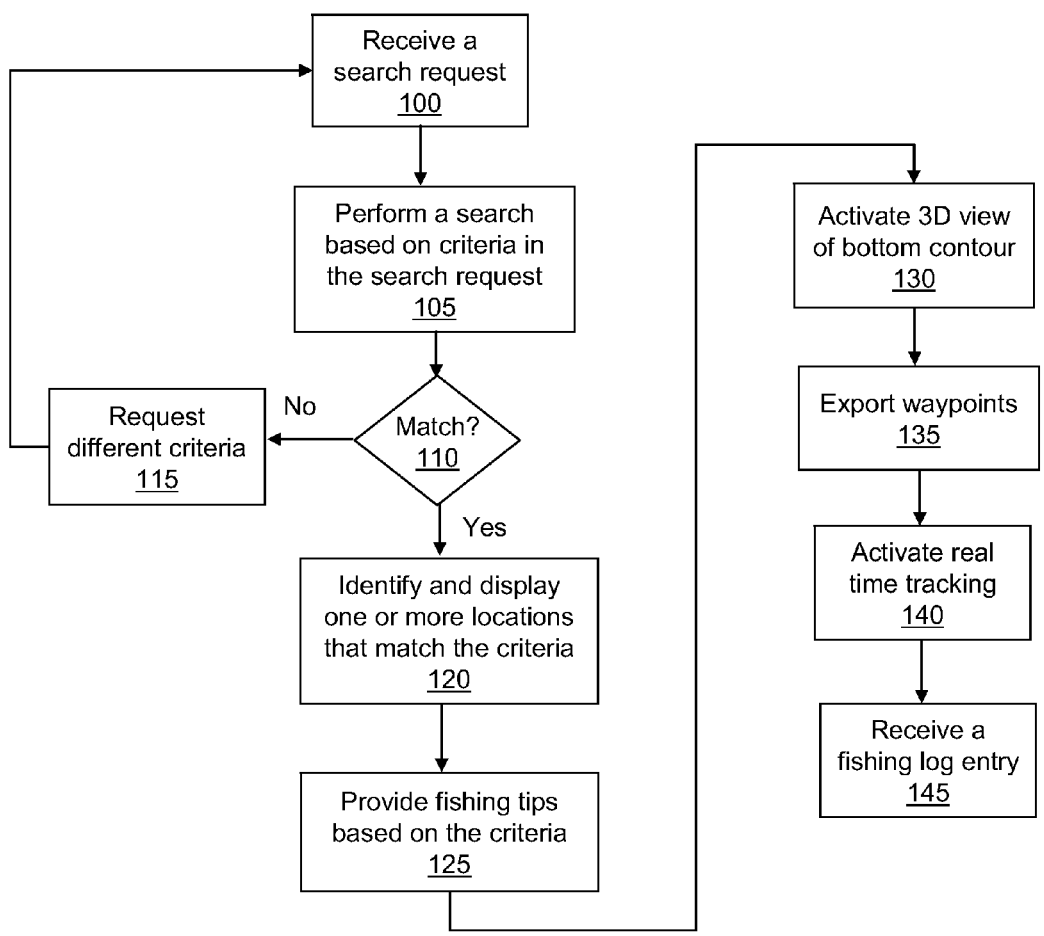
FIG. 1 is a flow diagram illustrating operations performed by a predictive mapping system in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

To predict where fish are located, many anglers (or fishermen) make predictions about the general region of the lake where fish can be found, the depth range(s) at which fish are located, the type of structure that fish are attracted to, the side of the structure where the fish are located, the type of cover that the fish may be using, and the food the fish may be seeking. These predictions can be based on the angler's general knowledge of fish habitat preferences, available food sources, and movement patterns. The predictions can also be based on fishing reports from other anglers, static lake maps that display depth contours, the angler's past experiences on that body of water, etc.

One tool that anglers (or fishermen) use to locate fish (based on predictions of where fish may be) is a map of a body of water. To date, fishing maps have consisted of simple paper maps or digital images of these paper maps. Both of these products can be useful tools, but they have significant shortcomings. Paper maps are large, bulky, and can easily be lost, torn, or damaged by water. Both forms of maps suffer because the map image is not linked to searchable map layers of fishing related data. Thus, to find areas that meet the angler's predicted criteria, the angler must perform a time consuming task of visually examining the map to look for subtle clues as to where fish might be located. Regions that could potentially hold high fish densities are often overlooked and the angler may spend a considerable amount of time fishing in unproductive waters.

Some fishing maps provide information about depth, slope (how quickly depth changes), and aspect (the cardinal direction the slope faces) of the bottom topography by providing contour lines. Each line is labeled with a certain depth. Because of the lack of digital data attributed to these contour lines, it is difficult for anglers to find all of the areas on the map that meet a desired criteria. Another problem with paper maps is that once an angler has identified potential areas on the map, it is difficult to find these locations on the water. Even if paper maps were to have grid lines with latitude and longitude coordinates, this may allow angler to find the general area. But, using grid lines can be difficult, and finding a precise location based on grid lines is nearly impossible.

As an example, based on predictions of where fish may be, an angler may use a map of the body of water to identify areas that have desired characteristics. The angler must then navigate to the identified areas on the body of water. A tool that would help anglers efficiently and accurately find locations where fish are concentrated for a given body of water, for the specific circumstances of that day, and then direct the angler to the latitude and longitude coordinates of the identified locations, would be very valuable. The better the angler can plan and then carry out that plan, the more likely the angler will be able to fish in areas of high fish densities.

Besides identifying the locations on the map and navigating to these locations on the water, the angler has to be able to maneuver the boat through or around these locations while fishing. This is an activity that can break an angler's concentration, especially in strong winds or currents. Concentrating on making accurate casts, presenting the bait/lure properly, and detecting strikes is essential. At the same time, boat control and navigation are also very important tasks. Proper boat placement is crucial if the angler wants to place themselves within casting distance of good fishing areas. A tool that would help an angler by automatically maneuvering the boat into desired locations or keeping the boat in a desired location would be very useful because it would allow the angler to concentrate on the actual act of fishing.

Described herein is a system which includes a combination of predictive data regarding fish species behavioral patterns, seasonal sunlight and weather conditions, and spatially referenced geographical lake data to predict fish locations for a body of water. The system can be used for any type of body of water, including but not limited to, lakes, streams, rivers, creeks, ponds, oceans, seas, etc. In one embodiment, the system utilizes a Composite Layer Development Tool (CLDT) to produce data files to a format that can be rapidly searched. A Geographic Information System (GIS) engine is designed to search multiple layers of data which is aggregated by the CLDT. The system also includes an easy-to-use computer software application and interface designed to view, navigate, and access search results for a given body of water.

In one embodiment, the system analyzes bodies of water to locate high densities of fish. The system allows the user to view, navigate, and electronically search data files and has built-in data parameters pertaining to well-established fish habitat preferences and migration patterns. The system also includes an integrated fishing log, the ability to customize maps, the ability to export selected areas to a global positioning system (GPS) device, and the ability to track an angler's current position in real-time if the angler's computer device is connected to a GPS receiver. In addition, the system can be linked to the navigational system of a boat to guide the boat to a desired location on the body of water, and to maneuver the boat through and around a plurality of desired locations while allowing the angler to focus on catching fish. The navigational system of the boat can include a trolling motor, an inboard boat motor, an outboard boat motor, and/or any other physical engine(s) or propeller(s)

FIG. 1 is a flow diagram illustrating operations performed by a predictive mapping system in accordance with an illustrative embodiment. In alternative embodiments, additional, fewer, and/or different operations may be performed. Also, the use of flow diagrams herein is not meant to be limiting with respect to the order of operations performed. In an illustrative embodiment, the predictive mapping system (or system) can be implemented at least in part through software that is intended to be installed on a user device. The user device can include, but is not limited to, a laptop computer, a desktop computer, an electronic notepad, a smart phone, a cellular telephone, a personal digital assistant, a portable gaming device, etc. In one embodiment, the system may be implemented using cloud computing. In such an embodiment, a user interface may be installed on the user device or accessible through a network browser. The user interface can allow the user to enter search requests which are then provided to a remote server/computer that is configured to process the search requests and send search results to the user through the user interface.

In an operation 100, a search request is received by the system through the user interface. In one embodiment, a desired body of water may be selected by the user prior to submitting the search request. In an alternative embodiment, the search request can include an identification of the body of water that the user would like to search. The body of water can be displayed to the user as an interactive map, which is described in more detail below. The interactive map can be accessible to the user prior to submission of any search request. As such, the user can view and explore the body of water to identify areas of interest without entering a search request. In an illustrative embodiment, the interactive map can be formed by an overlay of one or map layers. Illustrative map layers can include, but are not limited to, a depth layer, a slope layer, a points of interest layer (e.g., boat docks, boat ramps, buoys, beaches, etc.), an aspect layer, a location coordinates layer, a bottom structure layer, a bottom substrate layer (e.g., mud, sand, gravel, boulders, etc.), a sunlight exposure layer, a bottom cover layer (e.g., weeds, standing timber, stumps, artificial reefs, etc.), etc. A layer may also be used to illustrate roads and other bodies of water that are in proximity to the body of water of interest. The various layers and their uses are described in more detail below.

In one embodiment, the search request can be a fish search request that includes an identification of a species of fish that the user would like to locate. Common fish species can include smallmouth bass, largemouth bass, walleye, northern pike, catfish (generally or by species), panfish (generally or by species such as blue gill, perch, sunfish, etc.), crappie, trout (generally or by species), salmon (generally or by species), muskellunge, sturgeon, and so on. In alternative embodiments, any other fish species may also be included. The fish search request can also include a season of the year that the user plans to fish, a date that the user plans to fish, a time of day that the user plans to fish, and current or predicted weather conditions for the time when the user plans to fish. The weather conditions can include air temperature, cloud conditions, the amount of wind, precipitation, etc. In one embodiment, the system may automatically identify current or predicted weather conditions by accessing a weather database that includes current and/or forecasted information for the body of water. The system may also utilize historic weather information from one or more years past to predict water conditions for a given date/season. The fish search request may also include information specific to the current state of the body of water, such as water temperature, the height/amount of waves on the body of water, wind direction, an amount of murkiness on the body of water, dissolved oxygen levels in the water, etc. This information specific to the body of water can be provided by the user or obtained automatically by the system from a website or database that provides current conditions for the body of water.

As described in more detail below, upon receipt of the fish search request, the system can search map layers according to built-in parameters assigned to the user selected criteria. These built-in parameters can be based on established habitat preferences for the fish species along with known daily and seasonal migration patterns, reactions to certain weather conditions, etc. Based on the user inputs and built-in parameters, the system identifies areas of the body of water most likely to have high fish densities of the specified fish. For example, largemouth bass prefer habitats with vegetation or some other form of cover, they are rarely found deeper than 50 feet, and they are known to come into shallower water (3-10 feet for example) to spawn in the spring by following sharp sloped points. So, if a user wants to search for areas for largemouth bass in the spring (prior to spawning), the system would search the entire lake for areas within close proximity to vegetation or cover, with a sharp slope, and with moderate water depths (15-30 feet for example).

The search request may also be a general search request based on general pre-defined criteria that is commonly used by anglers. Examples of search criteria that may be included in a general search request can be areas with shallow structure, areas with deep structure, areas with structure at a typical deep weed line depth, areas with structure at a typical thermocline depth, etc. Additional pre-defined criteria can include flat or slightly sloped areas immediately adjacent to drop-offs, areas near tributary inlets with structure, areas with structure at a shallow weed line depth, areas with structure and a rocky bottom substrate, areas with structure and bottom cover such as weeds, stumps, and standing timber, etc. Another pre-defined criteria can include areas where there is an overlap of structure types such as a ledge on an underwater point. Such an area can be referred to as a 'spot on the spot,' as described in more detail below.

After one or more of these pre-defined criteria are selected in the general search request, the system can search the body of water for any locations that satisfy the criteria. As an example, a search for shallow structure can identify points, inside bends, and ledges in less than 15 feet of water throughout the body of water. As another example, a search for areas near tributary inlets with structure may identify areas within 250 meters of a river inlet that have an underwater point, inside bend, ledge, base of a drop-off, or any combination of these structure types. As another example, if the typical depth of the summer thermocline in a lake is 20 feet, a search for structure at the typical thermocline depth could identify areas that are 18-22 feet deep with an underwater point, inside bend, ledge, base of a drop-off, or any combination of these structure types. As a further example, a search for areas where there is an overlap of structure types could identify areas with a point or inside bend in combination with a ledge or base of a drop-off. As a further example, a search for flat areas adjacent to drop-offs could identify areas with a slope less than 10 degrees within 50 meters of areas with a slope greater than 45 degrees. The preceding examples are meant to be illustrative, and other values and/or criteria may be used to implement the general searches depending on the embodiment.

The search request may also be a custom search request that is not specific to any particular species of fish. Other than the particular species of fish, the custom search request may include any of the other information included in the fish search request or the general search request, as described above. The custom search request can also identify specific characteristics or attributes of the body of water that the user wishes to identify. For example, the custom search request can specify a desired water depth in terms of a specific depth (e.g., x units), as 'less than x units,' as 'greater than x units,' or as a range between x units and y units, where units can be in feet, yards, meters, miles, etc. The custom search request can also include a request for an identification of areas at or near the typical thermocline depth for a given body of water. The custom search request can also indicate a desired slope of a bottom surface of the body of water. As used herein, slope can refer to how quickly a depth of the body of water changes. In an illustrative embodiment, the requested slope can be flat, gradual, moderate, sharp, very sharp, etc. Alternatively, additional or fewer slope categories may be used. The custom search request can also indicate a desired aspect of structure on the bottom surface of the body of water. As used herein, the aspect can refer to the cardinal direction that the bottom surface or structure on the bottom surface of the body of water faces. Examples of aspect can include north, south, east, west, southeast, southwest, northeast, northwest, etc.

The user may also request areas in which vegetation is likely to be present in the body of water. For example, the user can search for vegetation on the surface of the water, such as lily pads. The user can also search for vegetation on or near the bottom surface of the body of water, or for vegetation at any other depth within the body of water. The system can identify vegetation based on areas where vegetation has been found in the past, based on the current weather, based on the weather for the last week, last month, etc., based on areas that receive more sunlight, based on dissolved oxygen levels in the water, based on the bottom substrate, etc.

The custom search request may also identify one or more types of desired structures that occur on the bottom surface of the body of water. Examples of such structure can include humps, underwater points, inside bends, holes, ledges of drop offs, bases of drop offs, etc. In one embodiment, the user may specify in the custom search request that any type of structure is desirable. The user can also search based on the type of substrate of the bottom surface, such as sand, gravel, large rocks or boulders, mud, etc. The user can also search based on a type and/or amount of bottom cover such as trees, logs, stumps, boulders, etc.

The user may also request identification (in the custom search request) of a portion of structure that is the most distinct part of the structure. The most distinct part of the structure, which can be referred to as a 'spot on the spot,' may be dependent on the type of structure. Underwater structure such as a point is in general is a good area that will attract fish, but if one part of that point has something else that 'sticks out,' such as a ledge, that area may attract even more fish. As another example, the most distinct part of a hump may be a point of the hump with the highest elevation or a portion of the hump that has the sharpest curvature. The most distinct part of a drop off may be where the slope of the drop off is greatest, or where the curvature of the drop off ledge is greatest. The spot on the spot may also be a location where two or more different types of structure meet, such as where a hump turns into a drop off ledge. The user can also search based on an amount of planiform curvature (e.g., points, inside bends, etc.) for any of the structural components on the bottom surface of the body of water. The user can also search based on an amount of profile curvature (e.g., ledges of drop offs, bases of drop offs, etc.) on the bottom surface of the body of water.

The custom search request can also request a desired amount of sun exposure based on the season of the year and the time of day. The season of the year and time of day can be provided by the user, or obtained automatically by the system based on the current time/season that the custom search request is submitted. In one embodiment, the system can analyze a depth grid (which can be one of the standard GIS files utilized by the system to obtain information) to determine how directly the sun will hit each location (e.g., cell) on the body of water at various times of the year (spring, summer, fall, winter) and day (morning, mid-day, afternoon, evening). This analysis produces a secondary GIS file for each of the possible time of year/day combinations with cell values representing the level of sunlight exposure. Secondary GIS files are described in more detail below. In one embodiment, to generate these values for sunlight exposure, the system can use known values for the sun angle (altitude and azimuth) for the various times of year and day along with the latitudinal and longitudinal coordinates of the body of water on earth. For example, if a lake X is at 44.233 degrees North and 85.456 degrees West, on a spring morning, the sun azimuth might be 124.2 degrees and the sun altitude might be 57.2 degrees. In an illustrative embodiment, the system has built in data to determine what values to use for sun azimuth and altitude based on the location and the time of year/day. The secondary file cells can be classified based on the amount of sunlight that is predicted at the locations, and this information can be encoded into composite layers, which are described in more detail below. In alternative embodiments, different algorithms may be used to calculate sunlight exposure.

The custom search request can also identify a specific region or section of the body of water that the user wishes to search. The specific region can be identified based on cardinal direction, named portions of the body of water, or the structural configuration of the body of water. For example, the user may generally specify bays of a large body of water, or may specify a specific named bay in the body of water. Similarly, the user can specify inlets, outlets, channels, the main body of water, etc. The user may also specify that he/she wishes to search the entire body of water.

In one embodiment, the custom search request can also include a proximity request. The proximity request can include a 'less than x distance units' from a location/feature on the body of water query, a 'greater than x distance units' from a location/feature on the body of water query, or an exact distance query. As such, the proximity request can be used to specify a distance to/from a specific location or feature of the lake. For example, the user may specify that he/she is only interested in locations that are within one mile of a specific boat landing on the lake. The user may also specify that he/she is interested in any location that is within x units (e.g., feet, meters, etc.) of a certain type of structure such as a drop off, or within x units of a specific type of slope. The user may also specify that he/she desires locations which are at least x units away from any portion of the lake that is less than x units deep.

Examples of locations/features of the body of water that can be specified in the proximity request can include, but are not limited to, a region/portion of the body of water, a depth of the body of water, a slope of the bottom surface of the body of water, an aspect of the bottom surface of the body of water, an amount of sun exposure to the body of water, a structure in the body of water, a spot on the spot in the body of water, an amount of vegetation in the body of water, etc. In an alternative embodiment, the above-described fish search request and/or general search request may also include any of the criteria described herein with respect to the custom search request.

In one embodiment, any of the search requests may also include a water level correction provided by the user or obtained automatically by the system. The water level correction can be a value by which the water level on the body of water is higher than normal or lower than normal. The system can automatically adjust water depths and any other attributes of the body of water based on the water level correction value.

In an operation 105, a search is performed based on the criteria set forth in the search request. In an illustrative embodiment, the search is performed on a set of aggregated data specific to the body of water that is the subject of the search request. In one embodiment, the search may be performed by a Geographic Information System (GIS) engine that is configured to search multiple layers of data which have been aggregated by a Composite Layer Development Tool (CLDT). Data aggregation and implementation of search requests is described in more detail below with reference to FIGS. 2-4. In an operation 110, the system determines whether there is a match to the search criteria (e.g., whether any portion of the desired body of water satisfies all of the search criteria from the search request). If there is not a match, the system informs the user that no portion of the body of water satisfies all of the search criteria, and requests different search criteria in an operation 115. The system can then receive a different search request from the user in operation 100.

If it is determined in operation 110 that there is at least one match, the one or more matching locations on the body of water are identified and displayed to the user on an interactive map of the body of water in an operation 120. In an alternative embodiment, the one or more matching locations on the body of water may also be presented as a list or table, and identified with longitudinal and latitudinal coordinates or any other coordinates known to those of skill in the art. In one embodiment, the one or more matching locations can be identified by brightly colored (e.g., red, orange, etc.) dots, lines, or shaded areas on the interactive map of the body of water. The user can then use a pointer to select one of the identified locations to obtain specific information regarding that location. The specific information can include, but is not limited to, coordinates, depth, slope, aspect, bottom structure, amount of vegetation, etc. If the search request was a fish search request, the one or more identified locations are predicted locations where the fish species identified in the fish search request is likely to be found based on any of the other criteria and information included in the fish search request. If the search request was a general or custom search request, the one or more identified locations are locations that meet all of the specified body of water criteria, but are not necessarily specific to any particular species of fish.

In an operation 125, the system provides fishing tips to the user based on the search request. If the search request was a fish search request, the fishing tips may be specific to the species of fish identified in the fish search request. Alternatively, the fishing tips may be general fishing tips specific to any type of fish. Fishing tips may also be provided in response to a custom search request in which no specific fish species was designated by the user. Fishing tips can include, but are not limited to, the types of structure that fish may be near, type(s) of live bait to use for fishing, type(s) of artificial bait to use for fishing, and/or the way(s) to present the bait to fish.

In one embodiment, the system may also access a fishing reports website or database and provide fishing tips based on where other anglers have reported catching fish, what baits other anglers are using, and/or what bait presentation techniques other anglers are using. In one embodiment, the fishing reports can also be used by the system in response to a fish search request to predict the one or more locations where fish may be present. In such an embodiment, the fishing report information may override fish preference data stored in the application. As an example, if a user searches for locations of walleye at a given time of year, with a given amount of sunlight and in a given body of water, the system has stored fish preference data regarding where walleye may be found in the body of water under those conditions. If the fishing report information indicates that walleye are being caught at different locations than those identified via the fish preference data, the system may override the fish preference data and identify the locations where other anglers are catching walleye. In an alternative embodiment, the system may provide both locations based on the fishing report data and locations based on the stored fish preference data. In such an embodiment, the system may distinguish between the two types of locations such that the user can decide whether to go where the other anglers are reporting good fishing or where the system would otherwise recommend.

In an illustrative embodiment, the default view of the interactive map is a top view of the surface of the water, including the land surrounding the body of water. Roads, boat landings, parks, campgrounds, bait shops, landmarks, and/or any other points of interest surrounding the body of water can also be displayed on the interactive map. In one embodiment, the user can select a portion of the interactive map to view a topography of the bottom surface corresponding to the selected portion. In an operation 130, a three-dimensional (3D) viewer is activated in response to such a selection from the user. The 3D viewer can be activated regardless of whether a search has been performed.

The 3D viewer can provide a 3D view of the bottom surface, and illustrate the structure. The 3D viewer can allow the user to rotate the view to see different perspectives and to magnify the view so that the bottom structure becomes more defined. The 3D view can also allow the user to navigate and explore along the bottom surface of the body of water by dragging the depicted view to display other areas. As such, the user can navigate along the entire bottom surface to identify structure of interest. When structure of interest is identified, the system can provide the user with the coordinates of the structure, the depth of the structure, the slope, the aspect, the bottom substrate, etc. such that the user is able to identify the location and determine whether to fish the location. Waypoints corresponding to identified bottom structures can also be exported to a global positioning system (GPS) enabled device such that the user is able to navigate to locations identified via the 3D viewer. When structure of interest is identified, the user can also search the entire body of water for locations with similar structure. The similar structures can be identified by location coordinates and/or dots, lines, shaded areas, etc. on the interactive map.

One way in which anglers can navigate to locations of interest on a body of water is through the use of a GPS enabled device that is configured to find specific location coordinates. The system described herein can be used with a GPS device such that the user can navigate to locations identified based on criteria in the search request and/or locations identified by the user from the interactive map. In an operation 135, if the device on which the system is installed does not have GPS functionality, the system exports one or more waypoints to a GPS device such that the desired locations are stored on the GPS device. A waypoint can refer to any reference point in physical space that is used for the purpose of navigation. In one embodiment, the waypoint can be specified by latitude/longitude coordinates or a range of latitude/longitude coordinates. As such, the user can use his/her GPS device to navigate to the desired location(s) on the body of water based on the stored waypoints.

In addition to GPS waypoints, desired routes can also be exported directly to a GPS device. The route can be any navigational course across the body of water. Data can be exported to the GPS device through a cable or wirelessly, and the data can be saved to a memory card used by the GPS device. In one embodiment, target locations can be exported as GPS waypoints. Target lines and areas can be exported as GPS tracks and routes. In one embodiment, the user can select which of a plurality of waypoints/routes/tracks that the user wants to have exported to the GPS unit. The export function can be configured to export data in a variety of formats that are compatible with a variety of GPS brands and devices.

In one embodiment, the device on which the system is installed may be GPS enabled. In such an embodiment, real time tracking can be activated in an operation 140. The real time tracking feature allows the user to have his/her current location displayed on the interactive map. The real time tracking allows the user to see where he/she is in relation to identified locations on the map, identified features on the map, etc. As the user moves across the water, the map layers on the interactive map display can move accordingly. In one embodiment, the real time tracking feature can be activated when the user is in 3D mode such that the user is able to continuously view the bottom structure as he/she traverses the body of water.

Anglers can use a fishing log function of the system to help record and organize information about past fishing trips. The fishing log can include information such as location coordinates, the date, the time of day, the water temperature, the weather conditions, the moon phase, the lures or bait used, the lure or bait presentation techniques used, how many fish were caught, what types of fish were caught, an overall success rating (e.g., Excellent, Good, Fair, Poor), etc. A fishing log entry is received in an operation 145. The information from the fishing log can be stored in a searchable database or other memory. As such, based on the coordinates provided in the fishing log, the system can display the previously fished locations on the interactive map for a given body of water. The user can then research past trips to plan for a future fishing trip. For example, if the users plans to go fishing the next day, the user can search his/her fishing log for the appropriate target species, season, weather conditions, etc. The user can also specify a minimal success rating of the past fishing trips. Based on the search criteria, a table of other listing of log entries meeting the selected criteria can be displayed. Numbered locations of these past trips that meet the specified criteria can also be highlighted on the interactive map.

In one embodiment, the angler can also upload trip photos into the fishing log to correspond with specific log entries. The photos can be displayed if the user selects the corresponding point on the interactive map or an image link listed in the table of identified log entries. In one embodiment, to add fishing log entries, the user can import GPS coordinates that are saved as waypoints, tracks, or routes on a GPS device. After importing the waypoints, the user would be able to enter more information about these fishing locations such as date, time of day, weather, target species, trip rating, baits used, presentation techniques used, etc. As the fisherman records productive spots in his/her fishing log, the user can use the system to find other areas on the body of water or on a different body of water with similar characteristics (depth, slope, etc.) as the areas identified in the fishing log. The system will find similar areas and locate and highlight new areas that match the criteria of a productive spot.

As noted above, the interactive map can be used to explore a body of water and identify locations on the body of water independent of any search request. If a search request is made, any locations on the body of water that satisfy the search criteria are displayed for the user on the interactive map. In addition to the functionality described above, the interactive map can allow the user to navigate around the map using navigational controls for left, right, up, down, zoom in to locations, and zoom out from locations. The user can also zoom into a certain area by selecting a zoom tool and dragging a rectangle over the area of interest. The user can pan, or drag the image across the screen by selecting a pan tool, clicking on the map, and moving a mouse (or other selection tool) in a desired direction while holding down the mouse select button. Using a target tool feature of the system, a user can draw points, lines, or areas on the map image and explore those locations. The locations can also be saved for later viewing and/or for exporting to a GPS device.

The interactive map can also include contour lines indicative of depth and slope as known to those of skill in the art. The user can turn on or off map layers and/or map labeling. For example, if a user wants to see a vegetation map layer, the user can select for that layer to be displayed. The user can similarly turn on/off the contour layer, the points of interest layer, the depth layer, a contour labels layer, a location names layer, a fishing log waypoint layer, a target tool layer, a bottom substrate layer, a bottom cover layer, a roads layer, a road labeling layer, a surrounding bodies of water layer, a boat ramps layer, a buoys layer, etc.

In one embodiment, the interactive map display can include a small map of the entire body of water in a corner of the screen which shows the location on the body of water that the current map view is zoomed to. A square on the overlay map can denote the location and extent of the current map view. The map view can be panned by dragging this square to a new location on the overlay map.

The system can also allow the printing of custom maps zoomed to the user's area of interest and with whichever map layers visible as the user desires. A legend can be placed on the map as a key to identify map features. By turning on and off the layers, a user can customize the information presented on the interactive map. Some layers may be divided into classes giving visual indication as to the value of data. For example, depths in the 10-15 feet range can be a different color than those in the 5-10 feet range. These classifications can also be displayed in the legend.

As described above, the user can also click on an area of interest within the interactive map and have information about that area displayed such as latitude and longitude coordinates, depth, slope, aspect, sunlight exposure, etc. The act of clicking on the interactive map initiates a query of the map layer databases for that particular location such that the information can be displayed. The user can also activate a function to have all areas of the body of water with similar depth, slope, aspect, structure type, etc. identified and displayed on the interactive map.

If the device on which the system is installed is GPS enabled, the system can also be used to control the navigational system of a boat to automatically guide the user to desired locations on the body of water. Such an autopilot function can also be performed if the navigational system of the boat is GPS enabled and the system can access GPS coordinates from the navigational system. The navigational system can be a trolling motor, an inboard motor, an outboard motor, etc. In one embodiment, the system can include a navigational system control interface through which the user can enter navigational instructions. The navigational instructions can include hovering the boat over the middle of a desired area, moving the boat around the perimeter of the area, causing the boat to move in a random or zig-zag pattern through the area, etc. The navigational instructions can also be used to specify a route for the boat to take. The navigational instructions can include a speed for the boat. In one embodiment, the user can select any area of the interactive map and have the boat navigate to that area. The user can also select several areas on the interactive map and have the boat navigate from point to point.

In one embodiment, the system can read National Marine Electronics Association (NMEA) format data that is output from a GPS enabled device in communication with the system. In alternative embodiments, other formats may be used. This data output can be a standard GPS output, and can provide the current boat location, course, and speed. This information, along with the information about the specific location or area identified in the system by the user, can be used by the system to calculate what course the boat should take in order to go to the selected area, hover over an area, go around the perimeter of an area, zig-zag through an area, etc.

In one embodiment, the system may send control signals to a receiver of the navigational system through a wired or wireless transmission. The receiver (of the navigational system) can be configured to communicate with the navigational system to automatically operate the boat at a desired speed, and to steer the boat in a desired direction. If wind or current push the boat off course, the system can identify that the boat is off course because the NMEA data from the GPS unit would reflect this drift in speed and direction. The system can automatically compensate by adjusting speed and steering direction to keep the boat on course. Once the autopilot function is engaged, the user can concentrate on making accurate casts, detecting strikes, landing fish, and observing depth finders and other onboard electronics. To disengage autopilot, the user can either use the standard navigational system controls, or select a stop button in the user interface of the system.

In one embodiment, the system aggregates data regarding bodies of water from a plurality of different sources. For example, one source may provide depth and slope information, one source may provide points of interest, one source may provide structural information, etc. In one embodiment, the sources of information can be Geographic Information System (GIS) files as known to those of skill in the art. In alternative embodiments, different information sources may be used. Files in GIS format often utilize two types of data: raster data and vector data. Vector data may be represented as points, lines, and polygons. Raster (grid) data is a form of data in which the data is structured into a layer of regularly spaced rows and columns. The square cells within these rows and columns are assigned values for the attribute that the grid represents. For example, each cell in a GIS grid file for water depth may be assigned a number representing the water depth at that particular location. The spatial location (longitude/latitude) of each cell is known based on the cell's location within the rows and columns. Both grid and vector data are sometimes referred to as 'layers' since the data from multiple files can occupy the same geographic location. The resolution of a grid is the size of each grid cell. A higher resolution grid has smaller cell sizes, which results in more precision, but a larger overall file size and slower processing speeds.

With standard GIS grid files, each file may represent a single attribute. For example, a GIS project for a body of water may have individual files for water depth, aquatic vegetation distribution, and slope of the lake bottom. Alternatively, a GIS file may represent two or more attributes of the body of water. Depending on the resolution and the spatial extent represented by these grids, the total space used to store these files can be quite large. The system described herein can be configured to directly utilize standard GIS files for extracting information in response to search requests. However, such direct use of GIS files is not ideal because the amount of storage required for numerous standard format GIS grid files for each body of water would make the distribution and storage of water data impractical. Each body of water would have numerous GIS grid files associated therewith to cover all of the attributes that are utilized by the system. Also, the processing time requirements for searching across multiple standard format GIS grid files would dissatisfy end users and place a high demand on the user's computing device. A fairly simple search across only a couple of GIS grid files may take several minutes depending on the processor speed of the user's computing device.

As such, the system utilizes a composite layer development tool (CLDT) that is configured to aggregate data from multiple sources into files that are small in size and readily searchable. The sources can be standard GIS files, however other sources may also be used. The (CLDT) is configured to convert standard GIS grid files into a new grid format, heretofore referred to as the 'Composite Layer' (CL). This process converts standard GIS grid files into a formatted raster graphic file, each pixel of which is a string of digits that holds attribute data from several standard format GIS grid files. This enables faster processing of the data files such that the system is able to analyze bodies of water to locate water characteristics and/or high densities of fish.

As used herein, the term pixel can refer to a standard sized graphics pixel as known to those of skill in the art. The size of each pixel (or cell) can correspond to a predetermined area on the body of water (e.g., each pixel can represent one square centimeter, one square meter, one square foot, etc. of the body of water). The size associated with the pixels (or cells) can affect the accuracy and resolution of the system. For example, large cells would cover a large area of the body of water, and there may be varying characteristics within that area. If the cell size corresponds to an area of several square meters, there may be different depths, slopes, etc. within that area. Conversely, if the cell/pixel size corresponds to an area of several square centimeters, it is much more likely that the attributes for that area are the same throughout the area.

The CL is a portable network graphics (PNG) formatted raster graphic file that is used to store GIS attribute data instead of color data. In alternative embodiments, other raster graphic formats may be used such as bitmaps, etc. Each pixel (or cell) within the CL has a value which is a string of digits that hold the attribute data from several standard format GIS grid files. For example, a single CL can store the information from standard format GIS grids for depth, slope, aspect, planiform curvature, profile curvature, vegetation, and any of the other attributes described herein. Because of the smaller file size requirements of graphic raster files, the file storage requirement of a single CL is much smaller than multiple standard grid files.

In an illustrative embodiment, each digit of a CL pixel value is assigned to an individual attribute. For example, the $1^{st}$ digit of the pixel value may be assigned to the 'aspect' attribute while the $2^{nd}$ digit may be assigned to the 'slope' attribute. Further, the individual digit values within the CL pixel values can be whole number values that represent the values of the original standard grid cell values. In one embodiment, the values for certain attributes can be categorized such that the individual digit value corresponding to that attribute represents a specific category or a range of actual values. For example, standard slope grid cell values greater than the $75^{th}$ percentile of slope may be categorized as "sharp" and assigned the whole number value of "8" while the standard aspect grid category for "North" may be assigned the value of "1". Based on the previous example, a CL pixel string (or value) of "18XXXXXX" has a sharp slope and a northern aspect, since the $1^{st}$ digit is "1" which was assigned to the cells of the original aspect grid categorized as 'North' and the $2^{nd}$ digit is "8" which was assigned to the cells of the original slope grid categorized as being sharp. The remaining values of the pixel string can similarly be assigned values corresponding to additional attributes of the body of water. This process can be repeated for each body of water that is covered by the system.

Each CL is spatially referenced, so the latitude and longitude location of the area the pixel represents on the lake is recognized by the system. The overall process of converting the standard format GIS files into CLs can be as follows. A standard grid representing water depth, etc., and vector layers representing such things as vegetation, boat ramps, and lake regions can be imported into the CLDT. The CLDT converts the standard format depth grid and vector layers into other standard format GIS grids that are stored temporarily and used in the next step of the process. For example, the standard depth grid may be used to derive standard grids for slope, aspect, sunlight exposure, and profile and planiform curvature. The cell values in these new standard grids are categorized and assigned whole number values based on pre-defined thresholds. Referring again to the example above, cells in the slope grid that are above the $75^{th}$ percentile may be categorized as "sharp" and given a whole number category value of "8". The whole number category values for each standard grid are transferred into specific predetermined digit positions within the pixel string of the CL. For example, if the whole number value assigned to the slope grid cells categorized as "sharp" was "8" and the slope attribute was assigned to the $2^{nd}$ digit of CL value, each CL pixel with a sharp slope would have the value of X8XXXXX. The preceding example utilizes a pixel string of seven digits. However, the number of digits used may be smaller or larger than seven depending on the number of attributes utilized by the system.

The system is able to read and analyze the pixel strings to quickly search for and identify areas of the body of water that satisfy specified search criteria. For each attribute (depth, slope, aspect, etc.), the system knows which specific CL to access, which specific digit position to analyze within the pixel string, and what category/value the digit value corresponds to. For example, if a user wants to find areas with a sharp slope and northern aspect, the system knows to look for "1" in the first digit and an "8" in the second digit of the pixel values in Composite Layer X. The values used for attributes and places of those attributes in the pixel string as describe herein are illustrative. In alternative embodiments, different values and/or places within the pixel string may be used.

Because the CLs combine attributes from numerous standard grids, the computer system can look for numerous attributes at the same time in a single scan through the CL pixel strings. This reduces processing time and allows the user to query across multiple attributes in seconds. In addition, the savings on storage requirements is significant allowing the practical distribution and storage of data corresponding to numerous bodies of water. This smaller file size allows the CLs to be of high resolution and provide the end user with more accurate fishing locations and/or information.

Figure 2:
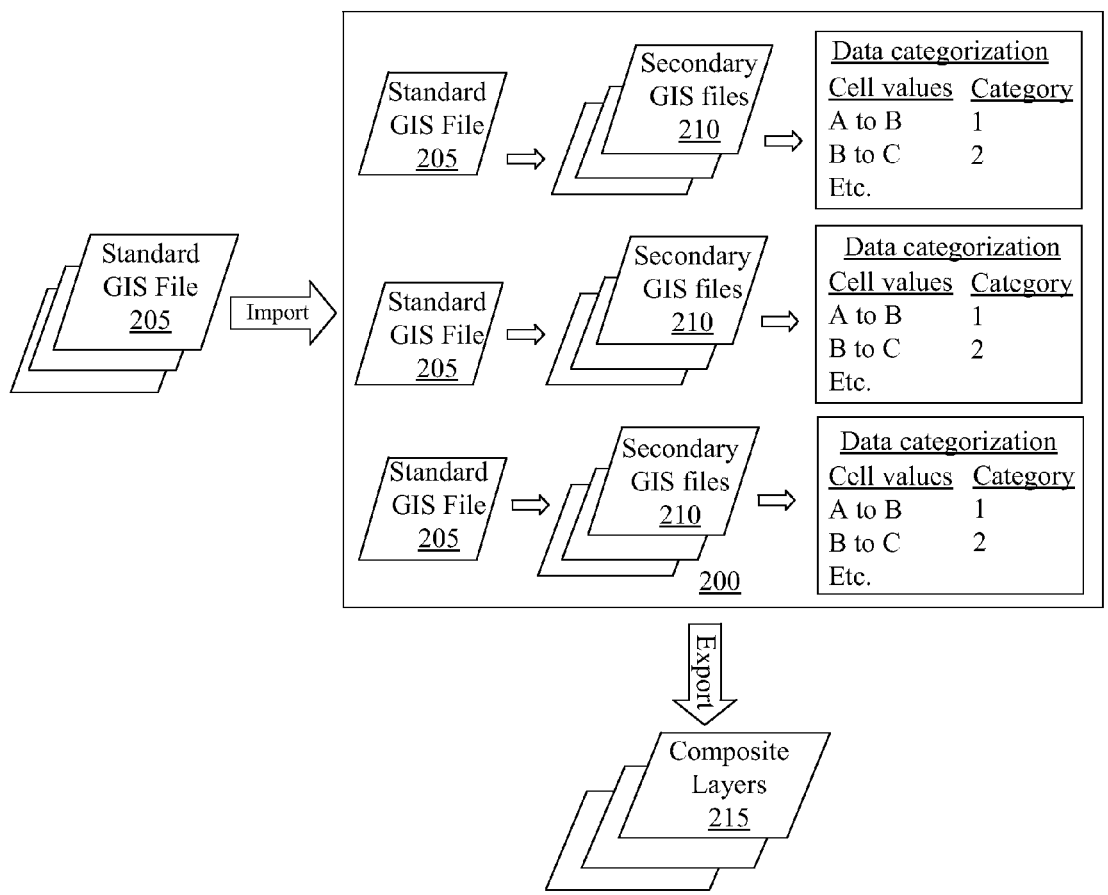
FIG. 2 is a diagram illustrating a composite layer development tool in accordance with an illustrative embodiment.

FIG. 2 is a diagram illustrating the composite layer development tool 200 in accordance with an illustrative embodiment. Standard GIS files 205 are imported into the CLDT, and the individual standard GIS files 205 are converted to secondary GIS files 210. In an illustrative embodiment, a plurality of secondary GIS files may be generated based on each standard GIS file, with each secondary GIS file corresponding to a different attribute of a given body of water. In one embodiment, the cell (or pixel) values in the secondary GIS files are categorized into single digit values from 0-9. In alternative embodiments, letters and/or symbols may be used instead of or in addition to numerical digits. In another alternative embodiment, a plurality of values may be used to represent a single attribute. For example, a given attribute may be categorized into one of 15 categories having values of 01, 02, 03, . . . , 13, 14, and 15. Alternatively, the letters A-O may be used to represent the 15 categories such that the attribute can be represented by a single digit in the pixel string. In an illustrative embodiment, the secondary files for depth are not categorized such that the system is able to search for specific depths, instead of categories that may be used for the slope (e.g., flat, gradual, moderate, sharp, etc.). The single (or multiple) digit values for each attribute are encoded into the cell values (pixel strings) of composite layers 215. In an illustrative embodiment, each row in block 200 of FIG. 2 may correspond to a distinct attribute, and each attribute can be independently categorized based on cell values specific to that attribute.

Figure 3:
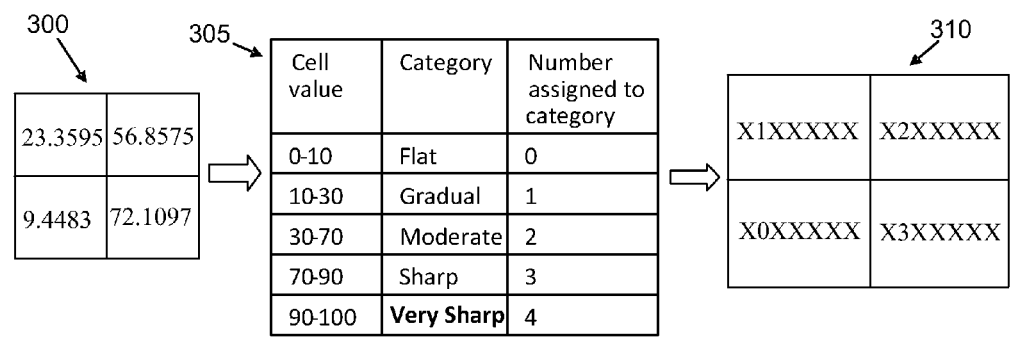
FIG. 3 is a diagram illustrating categorization of a slope attribute for a body of water in accordance with an illustrative embodiment.

FIG. 3 is a diagram illustrating categorization of a slope attribute for a body of water in accordance with an illustrative embodiment. A secondary GIS file 300 having four cells with values of 23.3595, 56.8575, 9.4483, and 72.1097 is depicted. The use of 4 cells in the secondary GIS file 300 is for illustrative purposes only. Depending on its size, a given body of water may be represented by thousands, millions, or billions of cells. Each of the cells (or pixels) in secondary GIS file 300 corresponds to a specific location on a body of water, and the numerical values in the cells represent a slope value obtained for the specific location associated with the cell. In an illustrative embodiment, the slope values for each cell are extracted from standard GIS files as described with reference to FIG. 2. A categorization table 305 is used by the CLDT to categorize the slope for each of the cells in secondary GIS file 300 based on the cell values. Alternatively, any other form of logic may be used to implement the categorization. In the embodiment of FIG. 3, the slope is represented by the second digit in the pixel string associated with each pixel. As such, the composite layer 310 illustrates the assigned slope value in the second digit as derived from each of the cells in secondary GIS file 300. As an example, the upper left hand cell in secondary GIS file 300 has a value of 23.3595 and, based on categorization table 305, is categorized as a 1. The other cells of secondary GIS file 300 are similarly categorized, and the appropriate values are placed in the second digit of the respective pixel strings. This process is repeated for each pixel (cell) for the body of water, and for each attribute utilized by the system. In an illustrative embodiment, the system can utilize separate logic (such as a categorization table, etc.) to categorize each attribute utilized by the system based on the characteristics of that attribute.

Figure 4:
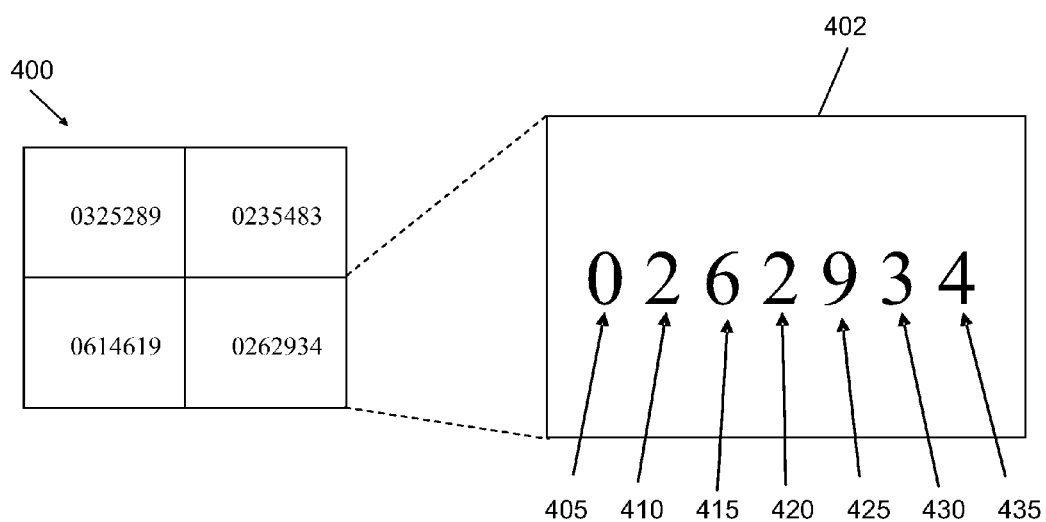
FIG. 4 is a diagram illustrating a pixel string in accordance with an illustrative embodiment.

In an illustrative embodiment, depth is not categorized by the system, but is included in the pixel string for each cell as an actual numerical value. In an illustrative embodiment, the depth is represented by three digits. Alternatively, additional or fewer digits may be used to represent the depth. FIG. 4 is a diagram illustrating a pixel string in accordance with an illustrative embodiment. A portion of a composite layer 400 is illustrated, and includes four cells having distinct pixel strings. The bottom right cell 402 has a pixel string of 0262934. In an alternative embodiment, the pixel string may be shorter if less attributes are included. In another alternative embodiment, the pixel string may be longer to include additional attributes. A first digit (0) 405 of the pixel string can represent a hundreds place for depth, a second digit (2) 410 of the pixel string can represent a value of slope, a third digit (6) 415 of the pixel string can represent aspect, a fourth digit (2) 420 of the pixel string can represent planiform curvature, a fifth digit (9) 425 of the pixel string can represent the tens place for depth, a sixth digit (3) 430 of the pixel string can represent profile curvature, and the seventh digit (4) 435 of the pixel string can represent the ones place for depth. As such, the location on the body of water corresponding to cell 402 has a depth of 94 units, a categorized slope of 2, a categorized aspect of 6, a categorized planiform curvature of 2, and a categorized profile curvature of 3. In alternative embodiments, a different ordering of attributes may be used within the pixel string.

Figure 5:
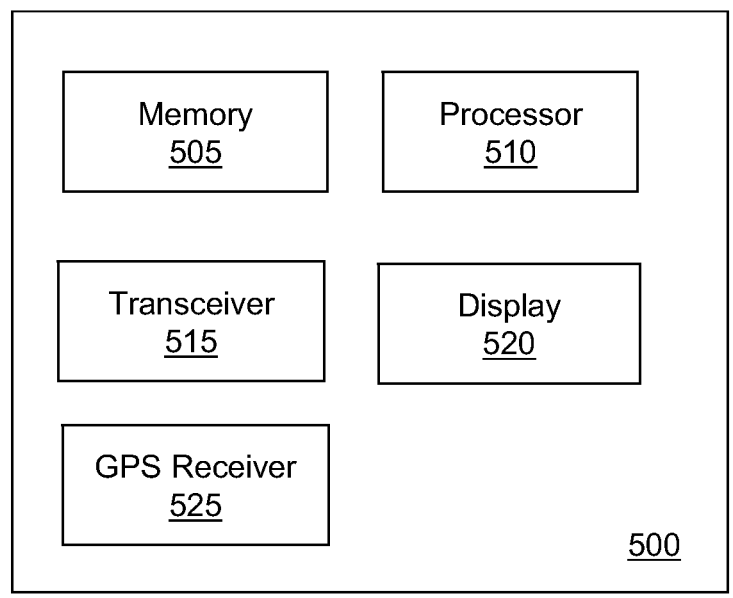
FIG. 5 is a block diagram illustrating a computer device for storing and implementing the system in accordance with an illustrative embodiment.

FIG. 5 is a block diagram illustrating a computer device 500 for storing and implementing the system in accordance with an illustrative embodiment. Computer device 500 includes a memory 505, a processor 510, a transceiver 515, a display 520, and a GPS receiver 525. In alternative embodiments, fewer, additional, and/or different components may be utilized as known to those of skill in the art. Memory 505 can be any type of computer memory known to those of skill in the art. In an illustrative embodiment, memory 505 can store the system in the form of computer-readable instructions that, when executed, cause any of the operations described herein to be performed. Processor 510, which can be any type of processor known to those of skill in the art, can be configured to execute the computer-readable instructions stored in memory 505. Transceiver 515 can be used to transmit and receive data from remote sources, such as a navigational system of a boat. In one embodiment, transceiver 515 is configured to receive instructions for implementing operation described herein from a remote location such as a server. Display 520, which can be any display known to those of skill in the art, allows an operator to view and interact with the interactive map and user interface of the system. GPS receiver 525 can be any standard GPS receiver known to those of skill in the art. In an illustrative embodiment, computer device 500 can also include a keyboard, a display, a mouse, a touch screen, etc. such that the user can interact with the system.

The embodiments described herein have been described primarily with respect to fishing. However, it is to be understood that the subject matter described herein is not limited to fishing embodiments. Other implementations and uses of the system can include, but are not limited to, identification of characteristics of a body of water for scuba diving, snorkeling, underwater treasure hunting, underwater excavation, underwater construction, etc. The system can also be used by law enforcement agencies to help identify potential underwater locations of missing bodies, missing evidence, etc.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, at a computing device, a search request that includes one or more search criteria for a body of water, wherein the one or more search criteria include an identification of a fish species;
   analyzing, by the computing device, in response to the search request, a data file including a plurality of cells that correspond to the entire body of water, wherein each cell corresponds to a given location on the body of water, wherein each cell is associated with a plurality of attributes of the given location, and wherein the analyzing considers each of the plurality of cells in view of the search criteria to result in an analysis of the entire body of water;
   identifying, based on the analysis, all locations on the entire body of water that satisfy the one or more search criteria, wherein the locations comprise predicted locations of the fish species within the body of water; and
   highlighting all of the identified locations on a map of the body of water.

2. The method of claim 1, wherein identifying the locations comprises identifying at least one value in a pixel string associated with a cell, and wherein the at least one value in the pixel string represents an attribute of the body of water that is relevant to the search request.

3. The method of claim 2, wherein the pixel string comprises a plurality of values corresponding to attributes of the body of water.

4. The method of claim 2, wherein the attribute comprises at least one of a depth associated with the cell, a type of bottom structure associated with the cell, or an amount of sunlight associated with the cell.

5. The method of claim 1, further comprising:
   importing attribute data for the body of water from a plurality of geographical information system (GIS) files;
   categorizing the attribute data for each of the plurality of cells, wherein the categorizing comprises assigning values to attributes of the body of water; and
   generating a pixel string for each of the plurality of cells based on the categorization of the attribute data.

6. The method of claim 1, further comprising:
   receiving global positioning system (GPS) coordinates corresponding to a location of a boat;
   receiving a selection of at least one of the identified locations; and
   causing a navigational system of the boat to navigate to the at least one selected location based at least in part on the GPS coordinates.

7. The method of claim 6, further comprising:
   receiving a selection of a speed of the boat; and
   causing the navigational system of the boat to move the boat at the selected speed.

8. The method of claim 6, further comprising causing the navigational system of the boat to hover the boat over the at least one selected location.

9. The method of claim 1, further comprising receiving a fishing log entry corresponding to a fishing trip on the body of water, wherein the log entry comprises coordinates of a location of the fishing trip, a number of fish caught on the fishing trip, and a type of the fish caught on the fishing trip.

10. The method of claim 1, further comprising:
    receiving a plurality of fishing log entries corresponding to fishing trips on the body of water;
    receiving a fishing log search request to identify previous fishing trips on the body of water, wherein the fishing log search request identifies the fish species; and
    providing fishing log search results in response to the fishing log search request, wherein the fishing log search results only include fishing log entries which indicate that the species of fish was caught.

11. The method of claim 1, further comprising:
    providing a three dimensional view of a bottom surface of the body of water;
    receiving a selection of a location on the bottom surface of the body of water; and
    exporting coordinates of the location on the bottom surface of the body of water to a global positioning system (GPS) device.

12. The method of claim 1, further comprising receiving a water level correction value, wherein the water level correction value comprises an amount by which a water level of the body of water is higher or lower than normal, and wherein the one or more identified locations are based at least in part on the water level correction value.

13. The method of claim 1, further comprising providing one or more fishing tips, wherein the one or more fishing tips are specific to the species of fish.

14. The method of claim 13, wherein the one or more fishing tips comprise at least a recommended bait and a recommended presentation technique for using the recommended bait.

15. A system comprising:
    a memory configured to store a data file including a plurality of cells that correspond to a body of water in its entirety, wherein each cell corresponds to a given location on the body of water, and wherein each cell is associated with a plurality of attributes of the given location; and
    a processor operatively coupled to the memory and configured to:
      receive a search request that includes one or more search criteria for the body of water, wherein the one or more search criteria include an identification of a fish species;
      analyze the data file in response to the search request, wherein the analyzing considers each of the plurality of cells in view of the search criteria to result in an analysis of the entire body of water;
      identify, based on the analysis, all locations on the entire body of water that satisfy the one or more search criteria, wherein the locations comprise predicted locations of the fish species within the body of water; and
      highlight all of the identified locations on a map of the body of water.

16. The system of claim 15, wherein, to identify the locations, the processor is further configured to identify at least one value in a pixel string associated with a cell, and wherein the at least one value in the pixel string represents an attribute of the body of water that is relevant to the search request.

17. The system of claim 15, wherein the processor is further configured to:
    receive global positioning system (GPS) coordinates corresponding to a location of a boat;
    receive a selection of at least one of the identified locations; and cause a navigational system of the boat to navigate to the at least one selected location based at least in part on the GPS coordinates.

18. A non-transitory computer-readable medium having instructions stored thereon, the instructions comprising:

instructions to receive a search request that includes one or more search criteria for a body of water, wherein the one or more search criteria include an identification of a fish species;

instructions to analyze, in response to the search request, a data file including a plurality of cells that correspond to the entire body of water, wherein each cell corresponds to a given location on the body of water, wherein each cell is associated with a plurality of attributes of the given location, and wherein the analyzing considers each of the plurality of cells in view of the search criteria to result in an analysis of the entire body of water;

instructions to identify, based on the analysis, all locations on the entire body of water that satisfy the one or more search criteria, wherein the locations comprise predicted locations of the fish species within the body of water; and instructions to highlight all of the identified locations on a map of the body of water.

19. The non-transitory computer-readable medium of claim 18, further comprising instructions to receive a water level correction value, wherein the water level correction value comprises an amount by which a water level of the body of water is higher or lower than normal, and wherein the one or more identified locations are based at least in part on the water level correction value.

20. The non-transitory computer-readable medium of claim 18, further comprising:

instructions to receive a plurality of fishing log entries corresponding to fishing trips on the body of water;

instructions to receive a fishing log search request to identify previous fishing trips on the body of water, wherein the fishing log search request identifies the fish species; and instructions to provide fishing log search results in response to the fishing log search request, wherein the fishing log search results only include fishing log entries which indicate that the species of fish was caught.

* * * * *